(12) United States Patent
Jinbo et al.

(10) Patent No.: US 8,028,650 B2
(45) Date of Patent: Oct. 4, 2011

(54) OPTICAL LENS COATING APPARATUS

(75) Inventors: Masahiro Jinbo, Tokyo (JP); Hiroshi Ota, Tokyo (JP); Takeshi Imizu, Tokyo (JP)

(73) Assignee: Hoya Corporation, Tokyo (JP)

( * ) Notice: Subject to any disclaimer, the term of this patent is extended or adjusted under 35 U.S.C. 154(b) by 1022 days.

(21) Appl. No.: 11/794,512

(22) PCT Filed: Mar. 4, 2005

(86) PCT No.: PCT/JP2005/003752
§ 371 (c)(1),
(2), (4) Date: Jun. 26, 2007

(87) PCT Pub. No.: WO2006/070488
PCT Pub. Date: Jul. 6, 2006

(65) Prior Publication Data
US 2010/0012028 A1    Jan. 21, 2010

(30) Foreign Application Priority Data
Dec. 27, 2004   (JP) .................................. 2004-377046

(51) Int. Cl.
*B05C 11/00* (2006.01)
*B05B 13/02* (2006.01)
(52) U.S. Cl. ............ 118/642; 118/643; 118/58; 118/62
(58) Field of Classification Search .......... 118/641–643, 118/58, 62–64, 500; 425/143, 161, 162, 425/174.4, 445, 808; 264/1.1, 1.36, 1.38; 427/164, 168; 206/438, 5.1; 359/586
See application file for complete search history.

(56) References Cited

U.S. PATENT DOCUMENTS

| 6,296,707 B1* | 10/2001 | Adamczyk et al. ........... 118/668 |
| 6,416,307 B1* | 7/2002 | Buazza et al. ................. 425/143 |
| 7,779,778 B2* | 8/2010 | Igarashi et al. ............... 118/319 |

FOREIGN PATENT DOCUMENTS

| JP | 58-166835 U | 11/1983 |
| JP | 06-052968 U | 7/1994 |
| JP | 09-071439 A | 3/1997 |

(Continued)

OTHER PUBLICATIONS

"Spectacles", May 22, 1986, pp. 81-83, Kabushiki Kaisha Medical Aoi Shuppan.

*Primary Examiner* — Yewebdar Tadesse
(74) *Attorney, Agent, or Firm* — Blakely, Sokoloff, Taylor & Zafman (57) ABSTRACT

A light irradiation device (151) includes a UV lamp (153), first and second optical filters (164, 165) which transmit and block wavelengths within different specific ranges, and a filter switching mechanism (162) which selectively interposes the first and second optical filters (164, 165) between the UV lamp (153) and an optical lens. The blocking wavelength of the first optical filter (164) is relatively longer than that of the second optical filter (165). The first optical filter (164) is interposed between the UV lamp (153) and the optical lens since the start of curing a coating solution until a lapse of a predetermined period of time. When the predetermined period of time has elapsed, the second optical filter (165) is interposed between the UV lamp (153) and the optical lens to replace the first optical filter (164).

5 Claims, 10 Drawing Sheets

FOREIGN PATENT DOCUMENTS

| | | |
|---|---|---|
| JP | 2000-303167 A | 10/2000 |
| JP | 2000-334369 A | 12/2000 |
| JP | 2001-059950 A | 3/2001 |
| JP | 2001-121064 A | 5/2001 |
| JP | 2003-160777 | 6/2003 |
| JP | 2004-261801 | 9/2004 |
| JP | 2004-290857 A | 10/2004 |

\* cited by examiner

OPTICAL LENS COATING APPARATUS

This is a non-provisional application claiming the benefit of International application number PCT/JP2005/003752 filed Mar. 4, 2005.

TECHNICAL FIELD

The present invention relates to an optical lens coating apparatus which cures a coating solution applied to a lens surface by ultraviolet irradiation to form a coating film.

BACKGROUND ART

In the fabrication of an optical lens, particularly a spectacle lens, in order to improve the light-shielding properties, anti-glaring properties, photochromic properties, anti-scratch properties, and the like, a coating film is formed on the surface of the spectacle lens using a material that matches the object of the spectacle lens. Formation of the coating film is described in "Spectacles", May 22, 1986, pp. 81 to 83, published by Kabushiki Kaisha Medical Aoi Shuppan. An apparatus that forms a coating film automatically is disclosed in Japanese Patent Laid-Open Nos. 2000-334369, 2004-290857, and the like.

The lens coating apparatus described in Japanese Patent Laid-Open No. 2000-334369 automatically performs a series of steps from the step of applying a coating solution to a lens surface to the step of curing the coating solution by ultraviolet irradiation. When curing the coating solution, air in a curing station is purged with nitrogen gas.

The coating apparatus described in Japanese Patent Laid-Open No. 2004-290857 comprises a photopolymerization chamber where photopolymerization takes place and a photopolymerization preliminary chamber serving as a front chamber of the photopolymerization chamber. Air in the two chambers is purged with an inert gas. When polymerizing a photocuring coating agent, a lens coated with the coating agent is stored in the polymerization preliminary chamber in advance, and air in the preliminary chamber is purged with nitrogen gas. Then, the lens is moved to the photopolymerization chamber and irradiated with ultraviolet radiation to polymerize the coating agent. The polymerization preliminary chamber is provided to shorten the time required for purging the nitrogen gas in the photopolymerization chamber to obtain a uniform film thickness and prevent color shading and a decrease in lens optical characteristics.

As the material of the coating film to form on the spectacle lens, a UV-curing resin added with a photopolymerization initiator is usually used. As the photopolymerization initiator, a mixture of two types of UV polymerization initiators that contribute to internal curing and surface curing is used. As the internal curing UV polymerization initiator, generally, bisacylphosphine oxide (BAPO) or bis(2,6-dimethoxybenzoyl)-2,4,4-trimethyl-pentylphosphine oxide is used. As the surface curing UV polymerization initiator, 1-hydroxy-cyclohexyl-phenyl-ketone described in, e.g., Japanese Patent Laid-Open No. 2000-334369 is used. BAPO is a polymerization initiator that can increase the photosensitivity on the long wavelength side to promote curing of the interior deep in the film, and is very effective particularly as the material of a pigment or ink coating which has a large thickness and low optical transmittance.

DISCLOSURE OF INVENTION

Problem to be Solved by the Invention

Usually, when forming on a spectacle lens a photochromic coat film which adjusts the light transmission amount in accordance with the ambient brightness, a UV-curing photochromic coating solution mixed with a UV polymerization initiator is applied to the coating target surface of the spectacle lens. The UV irradiate the coating solution to cure it to form a photochromic coat film. During UV irradiation, a UV filter is used to transmit and block wavelengths within specific ranges. For example, a UV filter is used that blocks light with a short wavelength of about 320 nm to 350 nm or less and transmits light with a wavelength longer than the upper limit of this range.

The photochromic coating film has a relatively large thickness of 5 μm and preferably 30 μm or more while other coating films having the light-shielding properties, anti-glaring properties, anti-scratch properties, and the like usually have thicknesses of about 1 μm. When surface curing progresses excessively, the possibility of reaction of radical-reactive portions in the inner photochromic layer decreases, or the long-wavelength UV do not reach the interior of the photochromic layer. Thus, internal curing of the film takes a long period of time to decrease the productivity. The coating apparatuses described in Japanese Patent Laid-Open Nos. 2000-334369 and 2004-290857 indicated above provide no countermeasures against this conventional problem.

The present invention has been made to solve the conventional problem described above, and has as its object to provide an optical lens coating apparatus which employs a plurality of types of optical filters having different blocking wavelengths so the coating solution can be cured within a short period of time, thus increasing the productivity.

Means of Solution to the Problem

In order to achieve the above object, the present invention comprises a light source which emits ultraviolet radiation to a coating solution applied to a coating target surface of an optical lens to cure the coating solution, and a filter switching mechanism disposed between the light source and the optical lens, wherein the filter switching mechanism comprises at least first and second optical filters which transmit and block wavelengths within different specific ranges of the ultraviolet radiation emitted from the light source, and filter switching means for selectively interposing the first optical lens and the second optical filter between the light source and the optical lens.

Effect of the Invention

The present invention comprises at least first and second optical filters having blocking wavelengths that are relatively different from each other. At the start of the curing treatment of the coating solution, when using the first optical filter having a relatively long blocking wavelength, the sensitivity on the long wavelength side can be increased to promote curing of the interior of the film of the coating solution. After that, the second optical filter having a relatively short blocking wavelength is used to cure both its interior and outside as a whole. This can form a coating film that is homogeneous from the interior to the surface of the film. This can also shorten the curing time to improve the productivity.

The present invention is particularly suitable for formation of a thick photochromic coat film.

BEST MODE FOR CARRYING OUT THE INVENTION

The present invention will be described in detail with reference to the embodiment shown in the accompanying drawings.

Figure 1:
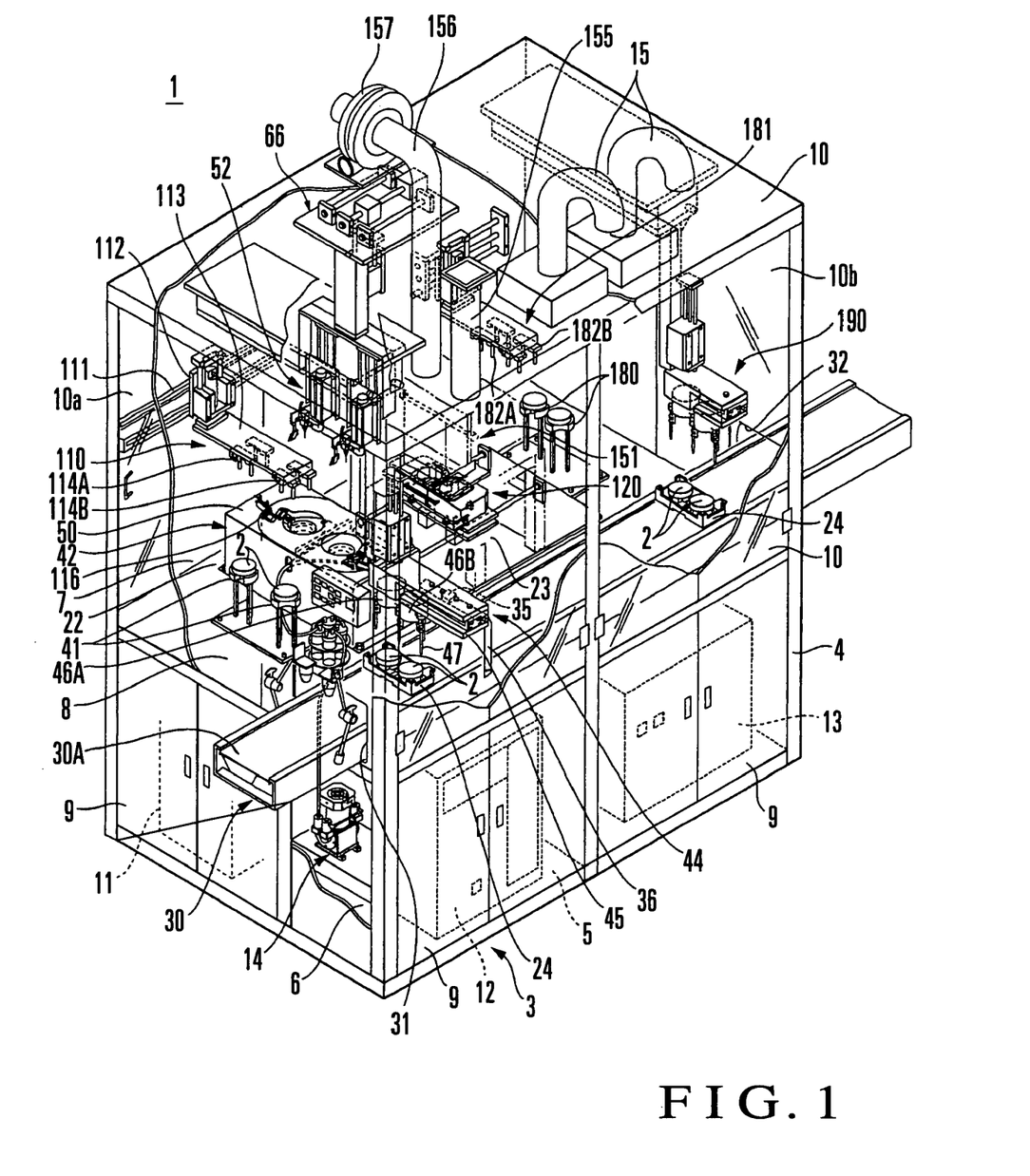
FIG. 1 is a partially cutaway perspective view showing the outer appearance of an optical lens coating apparatus according to an embodiment of the present invention.
Figure 2:
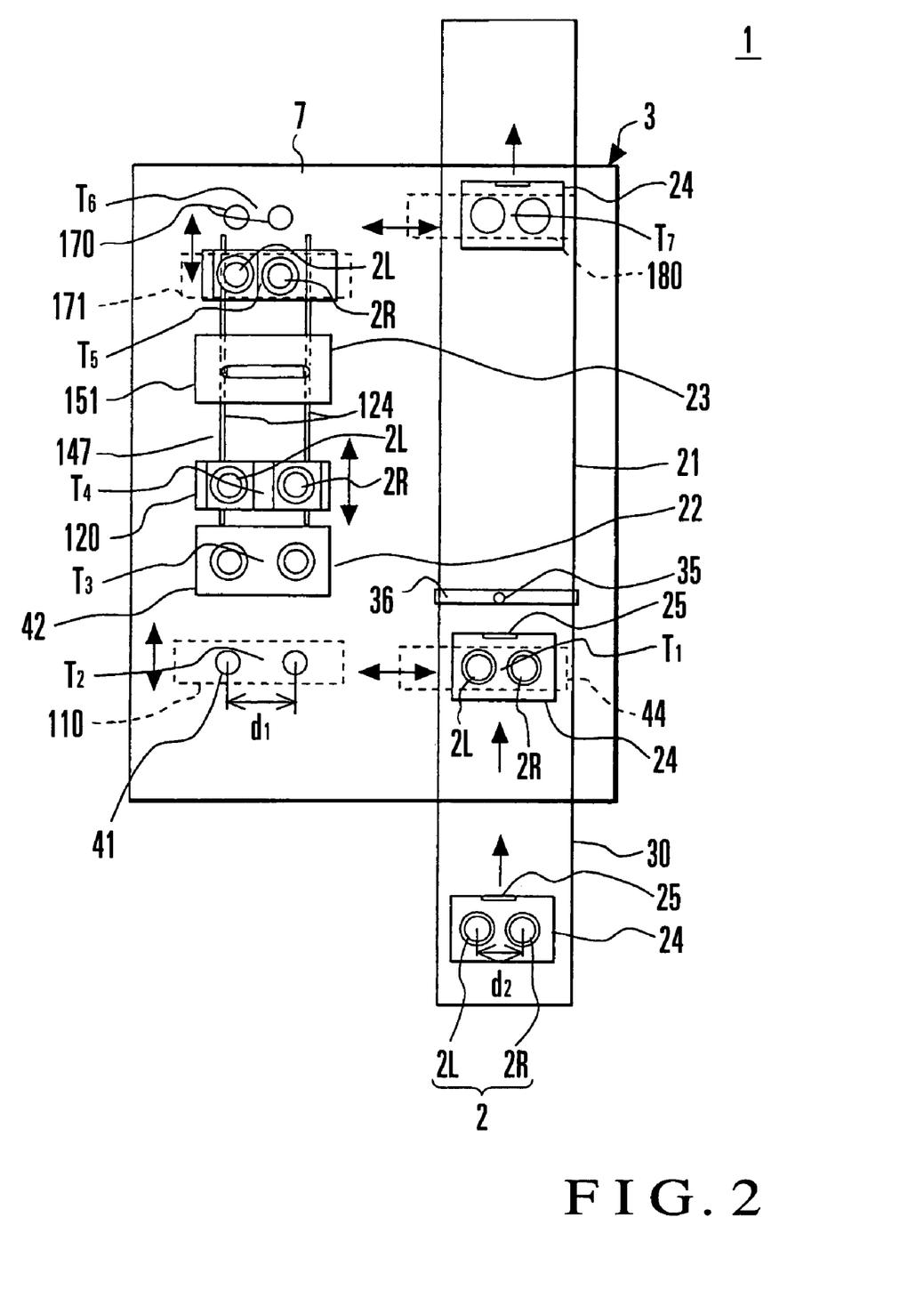
FIG. 2 is a schematic plan view showing the positional relationship among the various types of devices, means, and the like in the clean room of the coating apparatus shown in FIG. 1.

Referring to FIGS. 1 and 2, a coating apparatus denoted by reference numeral 1 comprises a cubic housing 3 which is set on the floor surface and long in the back-and-forth direction. The coating apparatus 1 automatically performs a series of operations of applying a coating solution on the lens surface and curing the coating solution by irradiating it with a light beam to form a coating film.

The coating apparatus 1 can perform operation of applying the coating solution to spectacle lenses 2 formed of a pair of lenses to be mounted in a spectacle frame and operation of curing the coating solution successively. As the coating solution to be applied to the spectacle lens 2, an ultraviolet-curing photochromic coating solution is employed.

The spectacle lens 2 is a round plastic lens having a convex surface serving as a coating target surface 2a which is polished to form an optical surface with a predetermined radius of curvature and a concave surface which is unfinished or polished to form an optical surface. The spectacle lens 2 is available in different types with diameters of, e.g., 65 mm, 70 mm, 75 mm, 80 mm, and the like. When spectacle lenses 2 formed of a pair of left- and right-eye lenses are to be discriminated, the left-eye lens will be denoted with a suffix (L) while the right-eye lens will be denoted with a suffix (R).

The housing 3 of the coating apparatus 1 comprises a housing-like frame structure 4 which is formed by connecting a plurality of frames, a bottom plate 5 of the frame structure 4, a base 8 which partitions the interior of the frame structure 4 into two, upper and lower chambers 6 and 7, nontransparent openable/closeable doors 9 which form the respective wall surfaces of the lower chamber 6, plates 10 which form the respective wall surfaces and the ceiling surface of the upper chamber 7, and the like.

The lower chamber 6 accommodates a control panel 11, a nitrogen gas supply device 12, an ultraviolet controller 13, members that constitute part of a coating solution collecting device 14, and the like. The control panel 11 serves to control the sequence of the first to sixth transport means (to be described later), a coating device 42, a light irradiation device 151, and the like, and connects to an external input device (not shown). As the external input device, for example, a personal computer is used. The personal computer sets the operation timings, operation durations, and the like of the first to sixth transport means, the coating device 42, the light irradiation device 151, and the like in accordance with respective spectacle lenses 2L and 2R. Signals from the personal computer are input to the control panel 11.

The upper chamber 7 accommodates the first to sixth transport mechanisms, the coating device 42, the light irradiation device 151, and the like. Clean air is supplied into the upper chamber 7 from above downward through supply pipes 15. Thus, the upper chamber 7 forms a clean room with an internal pressure slightly higher than the atmospheric pressure. Hence, the upper chamber 7 will be referred to as the clean room 7 in the following description. Transparent plastic plates are used to form, of the plates 10 that form the wall surfaces and ceiling surface of the clean room 7, those that form the wall surfaces. A plastic plate 10a that forms, of the wall surfaces, the front surface of the clean room 7 forms an openable/closeable door. A stainless plate is used to form the plate 10 that forms the ceiling surface.

The interior of the clean room 7 roughly comprises three regions, i.e., a tray transport portion 21, coating portion 22, and curing portion 23. The tray transport portion 21 is a portion through which a tray 24 which stores the pair of spectacle lenses 2L and 2R is transported backward from the front of the apparatus. The tray transport portion 21 forms a region that covers the entire length in the back-and-forth direction of the right side portion in the clean room 7. The coating portion 22 is a portion which applies the coating solution to the coating target surface 2a of the spectacle lens 2, and forms a region that covers the left side of the tray transport portion 21 on the front half of the clean room 7. The curing portion 23 is a portion which cures the coating solution applied to the coating target surface 2a of the spectacle lens 2, and forms a region that covers a portion behind the coating portion 22.

The tray 24 is formed by plastic injection molding into a housing and has two placing portions on its upper surface. The spectacle lenses 2L and 2R are to be placed on the two placing portions of the tray 24 with their coating target surfaces 2a facing up. A barcode 25 indicting the identification number of the tray 24 is adhered to the rear wall of the tray 24. The operator mounts the spectacle lenses 2 on the tray 24 and adheres the barcode 25 to the tray 24.

The tray transport portion 21 is provided with a first transport means 30 which transports the tray 24 backward from the front portion of the coating apparatus 1. As the first transport means 30, a belt conveyor 30A which is intermittently driven by a motor is employed. The front end of the belt conveyor 30A projects forward through an opening 31 formed in the front-side plastic plate 10a of the clean room 7. The rear end of the belt conveyor 30A projects backward through an opening 32 similarly formed in a rear-side plastic plate 10b of the clean room 7. When the tray 24 storing untreated spectacle lenses 2 is placed at the front end of the belt conveyor 30A, the belt conveyor 30A travels to transport the tray 24 to a first transfer position $T_1$ in the clean room 7 and stops temporarily.

The first transfer position $T_1$ is a front portion on the right side in the clean room 7, that is, a portion which is close to the opening 31 of the front-side plastic plate 10a. A tray stopper (not shown) which locks the tray 24 on the belt conveyor 30A and a barcode reader 35 which optically reads the barcode 25 are disposed near the first transfer position $T_1$.

The barcode reader 35 attaches to a gate-like attaching plate 36 which bridges the two, left and right side plates of the first transport means 30. When the barcode reader 35 reads the barcode 25 adhering to the tray 24, the signal of the barcode 25 is input to a host computer (not shown). Upon reception of the barcode signal, the host computer outputs lens information necessary for coating, e.g., the lens dioptric power, outer diameter, and central thickness, of the respective spectacle lenses 2L and 2R stored in the tray 24 to the external input device.

Upon reception of the lens information signal from the host computer, the external input device outputs a signal to the controller 11. The control panel 11 outputs a driving signal on the basis of the signal from the external input device to operate a second transport means 44.

The second transport means 44 has a pair of left and right clamp means 46A and 46B to clamp, each with three clamp pins 47, the respective spectacle lenses 2L and 2R. The clamp means 46A and 46B are arranged on a rail 45, extending in the left-to-right direction above the front end of the clean room 7, to be able to approach and separate from each other. When driven by a motor, the clamp means 46A and 46B reciprocate between the first transfer position $T_1$ and a second transfer position $T_2$. The three clamp pins 47 which clamp the spectacle lens 2 are disposed almost equidistantly on one circumference and driven by the motor to open/close synchronously.

The pair of clamp means 46A and 46B are arranged on the rail 45 to be vertically movable, and usually stand by above the first transfer position $T_1$. In this standby state, the pair of clamp means 46A and 46B are held at the same distance with a distance $d_2$ between the spectacle lenses 2L and 2R in the tray 24. When the tray 24 is transported to the first transfer position $T_1$ and stops, the pair of clamp means 46A and 46B move downward to clamp, each with the three clamp pins 47, the respective spectacle lenses 2L and 2R stored in the tray 24. The clamp means 46A and 46B then move upward again to transport the spectacle lenses 2L and 2R to above the second transfer position $T_2$, and stop. The clamp means 46A and 46B then move downward by a predetermined amount and open the clamp pins 47 to place the respective spectacle lenses 2L and 2R onto respective lens stages 41. At this time, the distance between the pair of clamp means 46A and 46B is changed to be equal to a distance $d_1$ between the two lens stages 41. The distance $d_1$ is set to be larger than the distance $d_2$ between the two spectacle lenses 2L and 2R stored in the tray 24. When the spectacle lenses 2 are completely transferred to the lens stages 41, the pair of clamp means 46A and 46B move upward again and are restored to above the first transfer position $T_1$ as the home position.

When the pair of clamp means 46A and 46B extract the spectacle lenses 2 from the tray 24 and transport them from the first transfer position $T_1$ to the second transfer position $T_2$, the tray 24 becomes empty. When the tray 24 becomes empty, the belt conveyor 30A is driven again to transport the empty tray 24 to a seventh transfer position $T_7$ (to be described later), and stops to make the tray 24 to stand by at this position.

The coating device 42 is disposed behind the two lens stages 41 on which the pair of spectacle lenses 2L and 2R are placed, thus constituting the coating portion 22.

Referring to FIGS. 3 to 6, the coating device 42 comprises a coating container 50 set behind the first lens stages 41, the coating solution collecting device 14 which collects an excessive portion of a coating solution 63 that has dripped in the coating container 50 for the purpose of reuse, and the like.

Figure 3:
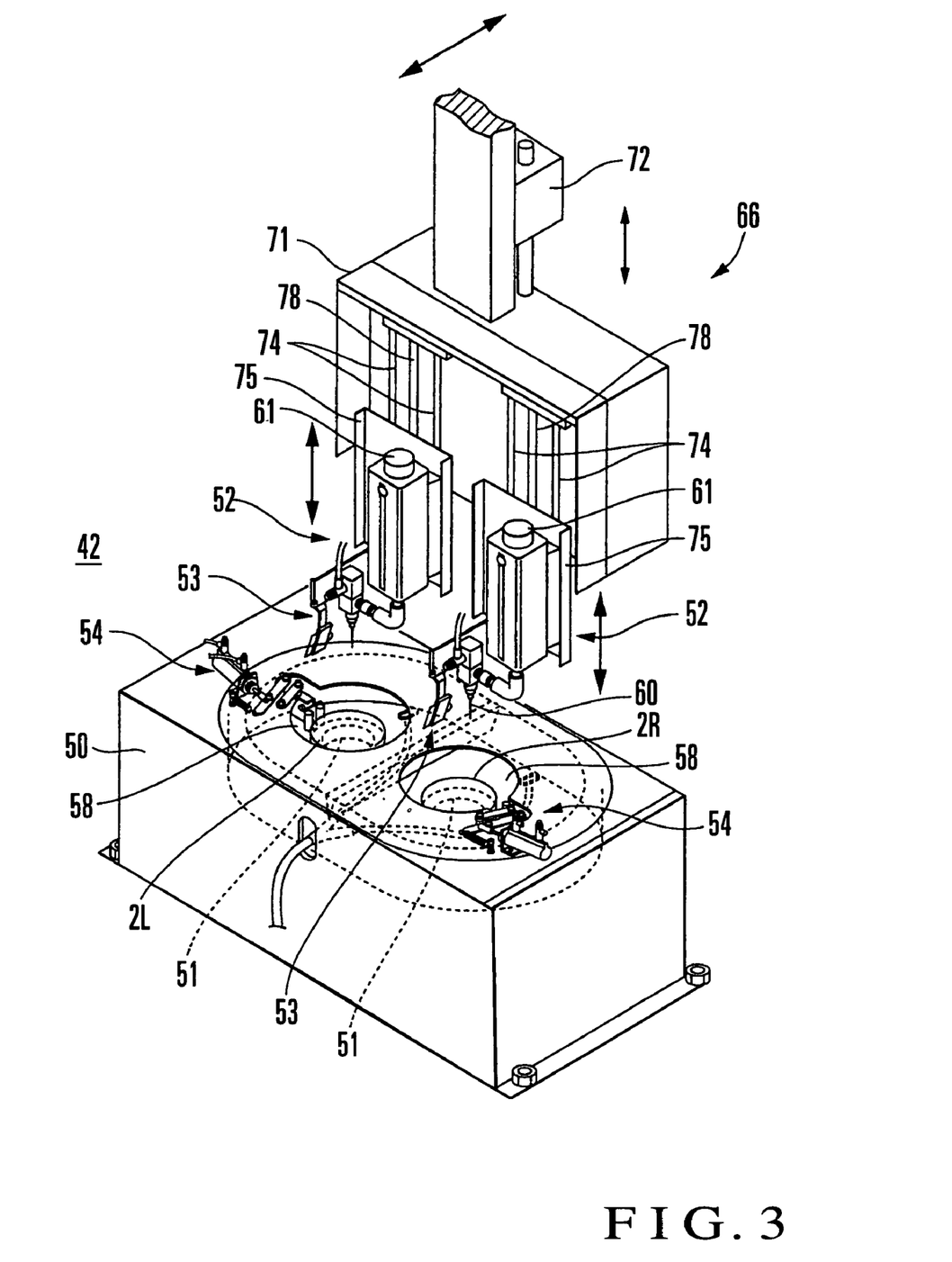
FIG. 3 is a perspective view showing the outer appearance of a coating device.
Figure 4:
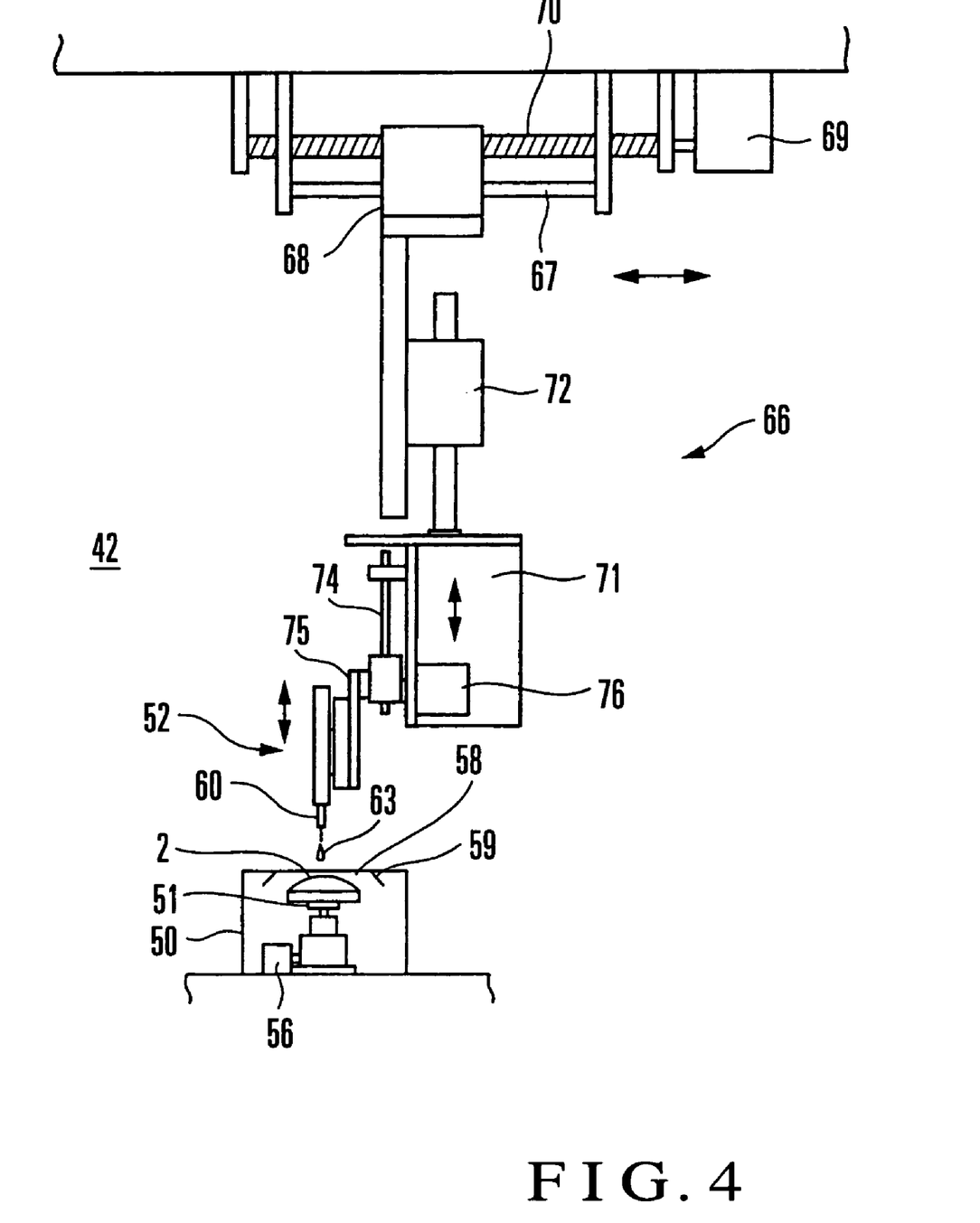
FIG. 4 is a schematic side sectional view of the coating device shown in FIG. 3.

The coating container 50 is formed of a hexahedron container which is long in the left-to-right direction and opens upward. A pair of left and right rotary tables 51 where the respective spectacle lenses 2L and 2R are to be set, and two stepping motors 56 which rotate the respective rotary tables 51 independently of each other are disposed in the coating container 50. A pair of left and right coating solution dripping means 52 which drip the coating solution 63 onto the coating target surfaces 2a of the respective spectacle lenses 2L and 2R, a pair of spatula mechanisms 53 which remove the excessive coating solution 63 staying on the peripheral portions of the coating target surfaces 2a of the respective spectacle lenses 2L and 2R, and a pair of lens outer surface solution smoothing mechanisms 54 which even the film thickness of the coating solution 63 attaching to edge surfaces 2b of the respective spectacle lenses 2L and 2R are disposed above the coating container 50.

When the rotary tables 51 chuck the spectacle lenses 2 placed on them by vacuum, the stepping motors 56 rotate the rotary tables 51 to spread thinly the coating solution 63 dripped onto the coating target surfaces 2a of the spectacle lenses 2 with centrifugal force to uniform the film thickness. The rotational speed of the rotary tables 51 can be switched between two levels from a low speed to a high speed. The low rotational speed is about 15 rpm, and the high rotational speed is about 54 rpm. The distance between the pair of left and right rotary tables 51 is equal to the distance $d_1$ between the first stages 41. The distance between the pair of rotary tables 51 is set larger than the distance $d_2$ between the two spectacle lenses 2 in the tray 24 so the coating solution 63 which scatters from each of the spectacle lenses 2L and 2R by the centrifugal forces will not attach to the adjacent other spectacle lens. On the lower surface of the upper plate of the coating container 50, baffles 59 attach to portions around respective openings 58 through which the respective spectacle lenses 2L and 2R are to be inserted. Each baffle 59 prevents the coating solution 63 scattering from the corresponding spectacle lens 2 with the centrifugal force from attaching to the other spectacle lens 2.

Each coating solution dripping means 52 comprises a nozzle 60, an exchangeable container 61 which stores the coating solution 63, a driving device 66 which moves the nozzle 60 together with the container 61 in the vertical direction and the back-and-forth direction when the coating solution 63 drips, and the like. The coating solution dripping means 52 are disposed above the coating container 50 to respectively correspond to the rotary tables 51. When a predetermined pressure is applied to the coating solution 63 in the container 61, it pushes out a predetermined amount of coating solution 63 through the nozzle 60 to drip onto the coating target surface 2a of the spectacle lens 2.

As the coating solution 63, a UV-curing photochromic composition blended with a photopolymerization initiator is used. As the photopolymerization initiator, a mixture of two types of UV polymerization initiators that contribute to internal curing and surface curing is used. As the internal curing UV polymerization initiator, BAPO which is described above, or bis(2,6-dimethoxybenzoyl)-2,4,4-trimethyl-pentylphosphine oxide is used. As the surface curing UV polymerization initiator, 1-hydroxy-cyclohexyl-phenyl-ketone which is described above is used.

Referring to FIGS. 3 and 4, the driving device 66 for the coating solution dripping means 52 comprises a first slide plate 68, a first motor 69 which moves the first slide plate 68 in the back-and-forth direction, a ball screw 70 which transmits the rotation of the first motor 69 to the first slide plate 68, and the like. The first slide plate 68 is disposed onto a pair of left and right guide bars 67, arranged on the ceiling surface of the clean room 7, to be movable in the back-and-forth direction. A second slide plate 71 which is vertically moved by a vertical cylinder 72 is disposed under the first slide plate 68. The vertical cylinder 72 fixes to the first slide plate 68. A pair of left and right third slide plates 75 and a pair of left and right second motors 76, which vertically move the third slide plates 75 independently of each other, are disposed to the second slide plate 71. A pair of left and right guide bars 74 attaching to the front surface of the second slide plate 71 hold the third slide plates 75 to be vertically movable. The rotation of the second motors 76 is transmitted to the third slide plates 75 through ball screws 78. The coating solution dripping means 52 attach to the front surfaces of the respective third slide plates 75.

When the coating solution dripping means 52 drips the coating solution 63 onto the spectacle lens 2, the driving device 66 drives and controls the coating solution dripping means 52 such that the nozzle 60 moves spirally from the periphery of the spectacle lens 2 inwardly. When the coating solution 63 drips onto the coating target surface 2a of the spectacle lenses 2, it spreads onto the entire surface of the coating target surface 2a with the centrifugal force generated by the rotation of the rotary table 51, and partly scatters to fall in the coating container 50.

In this manner, when the coating device 42 applies the coating solution 63 to the coating target surface 2a of each of the spectacle lenses 2L and 2R by spin coating, the film thickness of the coating solution 63 increases on the peripheral portion of each coating target surface 2a to form a swell by surface tension. If the film thickness of the coating solution 63 on the peripheral portion of the coating target surface 2a is large, when the coating solution 63 is cured in the next curing step by ultraviolet irradiation, wrinkles may be formed on the coating film.

To prevent this, the coating device 42 comprises the spatula mechanisms 53 which remove the excessive coating solution 63 on the peripheral portions of the coating target surfaces 2a of the respective spectacle lenses 2L and 2R so as to uniform the film thicknesses.

Figure 5:
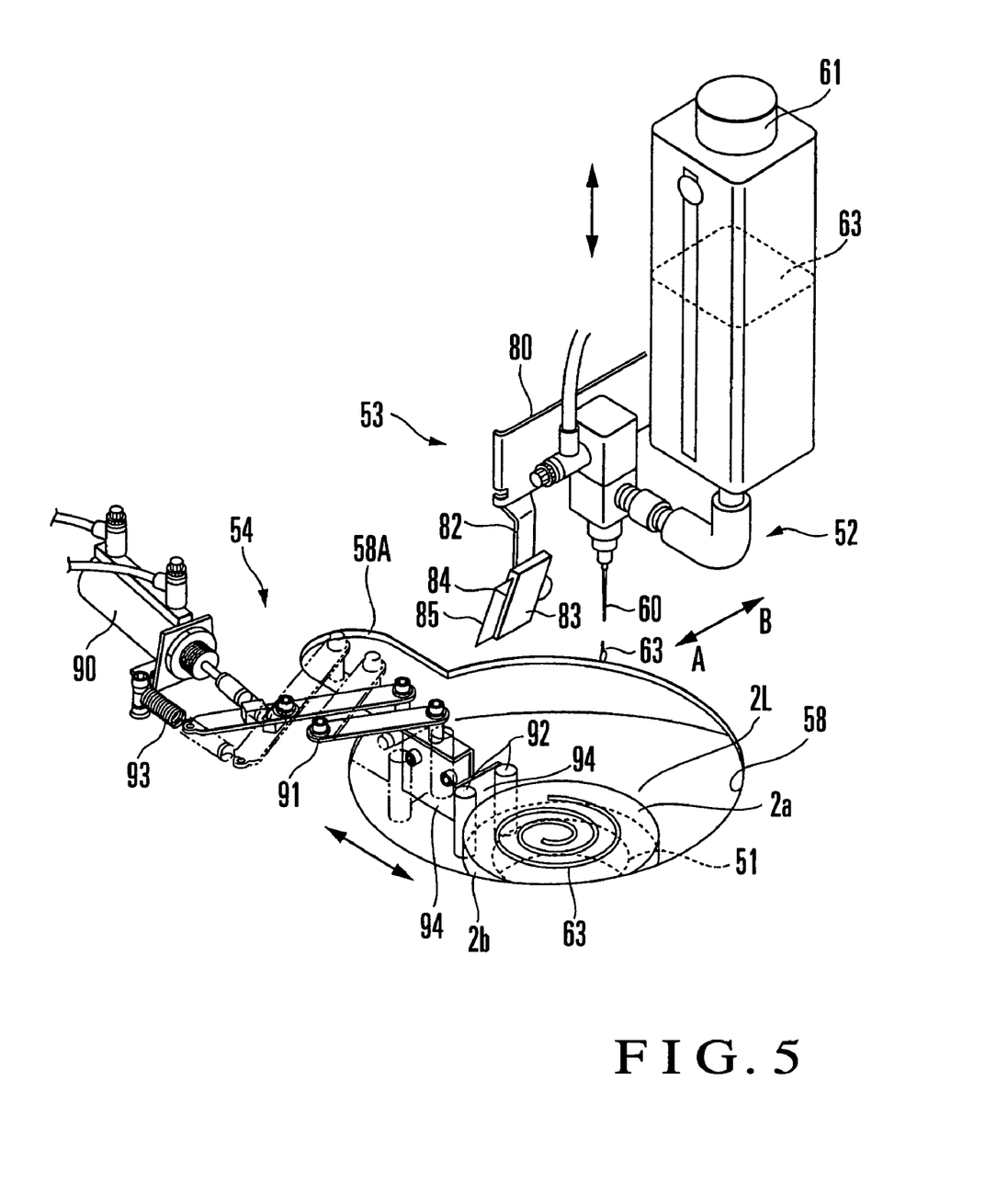
FIG. 5 is a perspective view showing the outer appearance of a coating solution spatula mechanism and a lens outer surface solution smoothing mechanism.

Referring to FIG. 5, each spatula mechanism 53 comprises a support arm 80 attaching to the third slide plate 75, an attaching plate 82 attaching to the distal end of the support arm 80 so as to be located on the left side of the nozzle 60, a holder 83 attaching to the lower end of the attaching plate 82, a spatula plate 85 detachably inserted and fixed in a slit 84 formed in front end face of the holder 83, and the like. The holder 83 attaches to the support arm 82 to be inclined toward the spectacle lens 2 at a necessary angle, e.g., 45°, with respect to the vertical line. Thus, the spatula plate 85 is also inclined in the same direction at the same angle as the holder 83 is. The spatula plate 85 is also inclined at a necessary angle, e.g., 30°, so that its rear end side is farther away from the spectacle lens 2 than its front end with respect to the back-and-forth direction of the coating solution dripping means 52, i.e., directions of arrows A and B in FIG. 5. That is, the spatula plate 85 is inclinedly attached to the holder 83 to intersect the vertical line and the horizontal line in the back-and-forth direction. Hence, when the spatula mechanism 53 is in a use state, the front end of the spatula plate 85 comes into contact with the left side of the peripheral portion of the coating target surface 2a of the spectacle lens 2L to scrape off the excessive coating solution 63, which stays on the entire peripheral portion of the coating target surface 2a, by rotation of the spectacle lens 2L.

When the spatula mechanism 53 is in a non-use state wherein the coating solution is not to drip, it stands by behind the spectacle lens 2L. When the coating solution 63 drips, the spatula mechanism 53 moves to the left side of the spectacle lens 2L by the forward movement of the first slide plate 68. When the front end edge of the spatula plate 85 comes into contact with the peripheral portion of the coating target surface 2a, the spatula plate 85 scrapes off the excessive coating solution 63 staying on the entire peripheral portion of the coating target surface 2a. At this time, the rotational direction of the spectacle lens 2 is clockwise in FIG. 5. In FIG. 5, the spatula mechanism 53 for the left-eye spectacle lens 2L is described. The spatula mechanism 53 for the right-eye spectacle lens 2R also has completely the same structure, and a repetitive description will be omitted.

When the coating device 42 applies the coating solution 63 to the coating target surfaces 2a of the spectacle lenses 2L and 2R by spin coating, the coating solution 63 droops from the peripheral portions of the coating target surfaces 2a along the outer surfaces 2b and swells like streaks. Hence, the coating device 42 is further provided with the pair of lens outer surface solution smoothing mechanisms 54 to correspond to the respective spectacle lenses 2L and 2R. The solution smoothing mechanisms 54 thinly spread the coating solution 63 attaching to the outer surfaces 2b over the entire outer surfaces 2b so the film thicknesses of the coating solution 63 become even.

Each solution smoothing mechanism 54 comprises a holding mechanism 91 actuated by a driving device 90, and a pair of coating solution removing members 92. As the driving device 90, an air cylinder is employed. The holding mechanism 91 comprises a stretchable pantograph mechanism, and a tensile coil spring 93 usually holds the holding mechanism 91 in a folded state. In actuation, when the driving device 90 is driven to stretch the holding mechanism 91 against the tensile coil spring 93, the holding mechanism 91 urges the pair of coating solution removing members 92 against the outer surface 2b of the spectacle lens 2L with a predetermined pressure.

The coating solution removing members 92 are formed of a highly adsorptive foamed resin, preferably sponge, into cylindrical shapes and vertically attach to the surface of an attaching plate 94, attaching to the front end of the pantograph mechanism 91, at a predetermined gap from each other in the back-and-forth direction. When the coating solution removing members 92 are urged against the outer surface 2b of the rotating spectacle lens 2L, they spread the coating solution 63 attaching to the outer surface 2b thinly over the entire outer surface to have a uniform film thickness. The spatula mechanisms 53 and solution smoothing mechanisms 54 are configured to actuate almost simultaneously after the coating solution dripping means 52 drips the coating solution 63.

Figure 6:
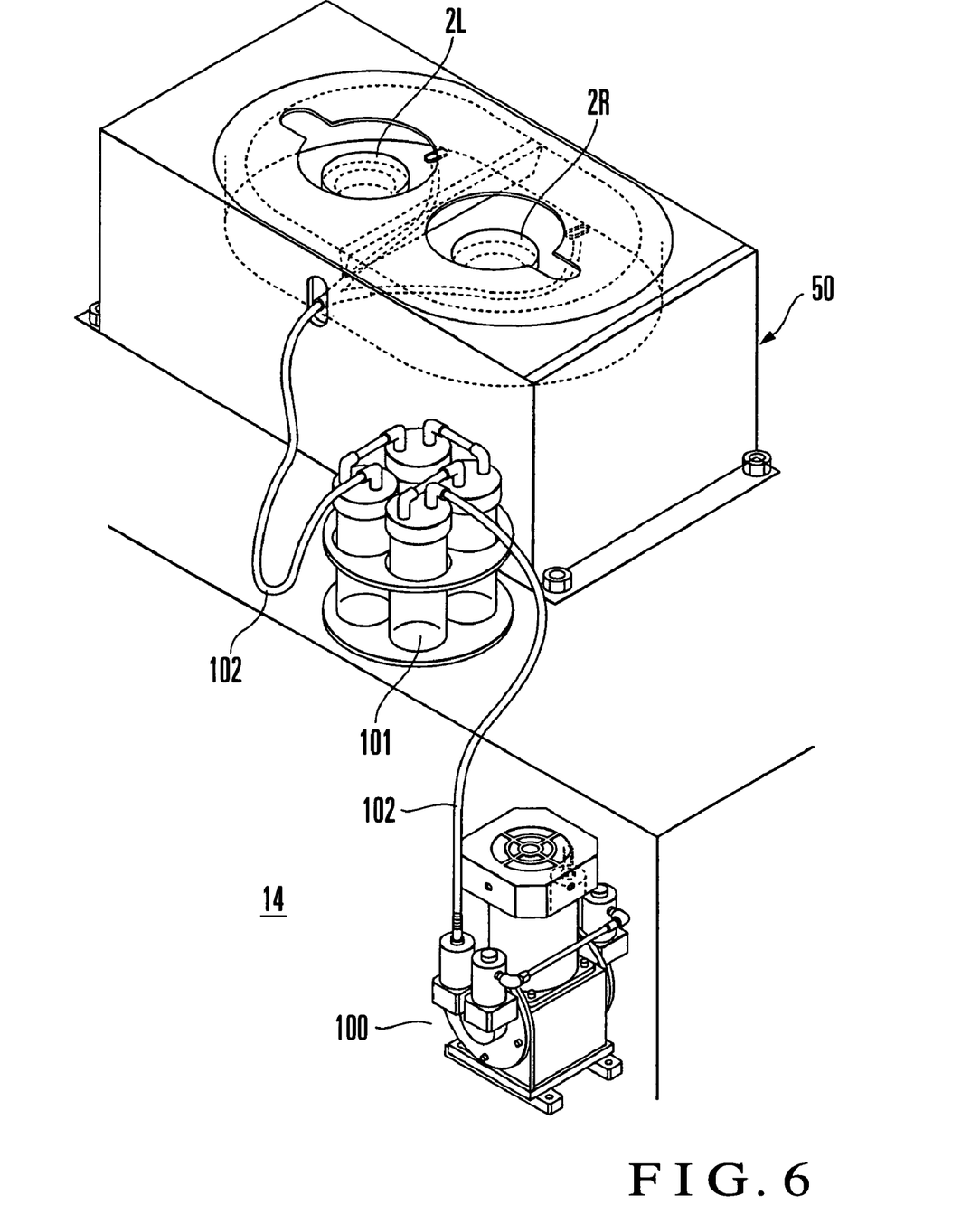
FIG. 6 is a perspective view showing the outer appearance of a coating solution collecting device.

Referring to FIG. 6, when the excessive coating solution 63 which scatters from the coating target surface 2a of the spectacle lens 2 with the centrifugal force or is removed by the spatula mechanism 53 or lens outer surface solution smoothing mechanism 54 falls into the coating container 50, the collection device 14 collects it to reuse it. The coating solution collection device 14 comprises a suction pump 100 and a plurality of collecting containers 101 which collects the coating solution 63. The lower chamber 6 of the housing 3 shown in FIG. 1 stores the suction pump 100. A pipe 102 connects the plurality of collecting containers 101 in series to each other. One end of the pipe 102 is connected to the suction pump 100. The other end of the pipe 102 is branched in a Y shape, and the two branch portions are inserted in the coating container 50 and positioned immediately under the respective spatula mechanisms 53.

Referring to FIGS. 1 and 2 again, a third transport means 110 which reciprocates among the second transfer position $T_2$ and third and fourth transfer positions $T_3$ and $T_4$ is provided above the coating portion 22. The third transfer position $T_3$ is where the coating device 42 is arranged. The fourth transfer position $T_4$ is behind the third transfer position $T_3$ and where an empty lens rack 120 stands by.

As shown in FIG. 1, the third transport means 110 comprises a slider 112 which is arranged on a horizontal rail 111 arranged on the left inner wall of the clean room 7 to be movable in the back-and-forth direction, a motor (not shown) which reciprocally moves the slider 112, a horizontal attaching plate 113 which extends rightward and is arranged on the slider 112 to be vertically movable, a driving device (not shown) which vertically moves the attaching plate 113, a pair of left and right clamp means 114A and 114B which attach to the lower surface of the attaching plate 113, and the like.

Each of the clamp means 114A and 114B has four openable/closeable clamp pins 116 which clamp the outer surface $2b$ of the corresponding one of the spectacle lenses 2L and 2R, and a driving device (not shown) such as a motor which opens and closes the clamp pins 116, and reciprocates between the second and fourth transfer positions $T_2$ and $T_4$. The four clamp pins 116 comprise two, left and right pins in front and two, left and right pins at the back. The two, front and rear clamp pins that oppose each other approach and separate from each other.

The pair of clamp means 114A and 114B usually stand by above the second transfer position $T_2$, and are drive-controlled in the following manner. When the spectacle lenses 2L and 2R are placed on the respective first stages 41, the clamp means 114A and 114B move downward to hold the lenses, move upward again to transport them to the third transfer position $T_3$, and transfer them onto the respective rotary tables 51 in the coating container 50. When the coating device 42 finishes applying the coating solution 63 to the spectacle lenses 2, the pair of clamp means 114A and 114B hold the spectacle lenses 2L and 2R, coated with the coating solution 63, on the respective rotary tables 51 again, extract the spectacle lenses 2L and 2R from the coating container 50, transport them to a portion above the fourth transfer position $T_4$, and stop there. The pair of clamp means 114A and 114B then move downward to store the spectacle lenses 2L and 2R into the empty lens rack 120 standing by at the fourth transfer position $T_4$.

The distance between the pair of clamp means 114A and 114B is set equal to the distance $d_1$ between the first stages 41. The upper surface openings 58 of that storing portion of the coating container 50 which stores the spectacle lenses 2L and 2R form circles larger than circles circumscribed by the clamp pins 116 in the maximal open state, so the third transport means 110 can store and extract the spectacle lenses 2 readily. Each opening 58 has a U-shaped groove 58A, as shown in FIG. 5, through which the holding mechanism 91 of the corresponding lens outer surface solution smoothing mechanism 54 can move forward/backward.

Figure 7:
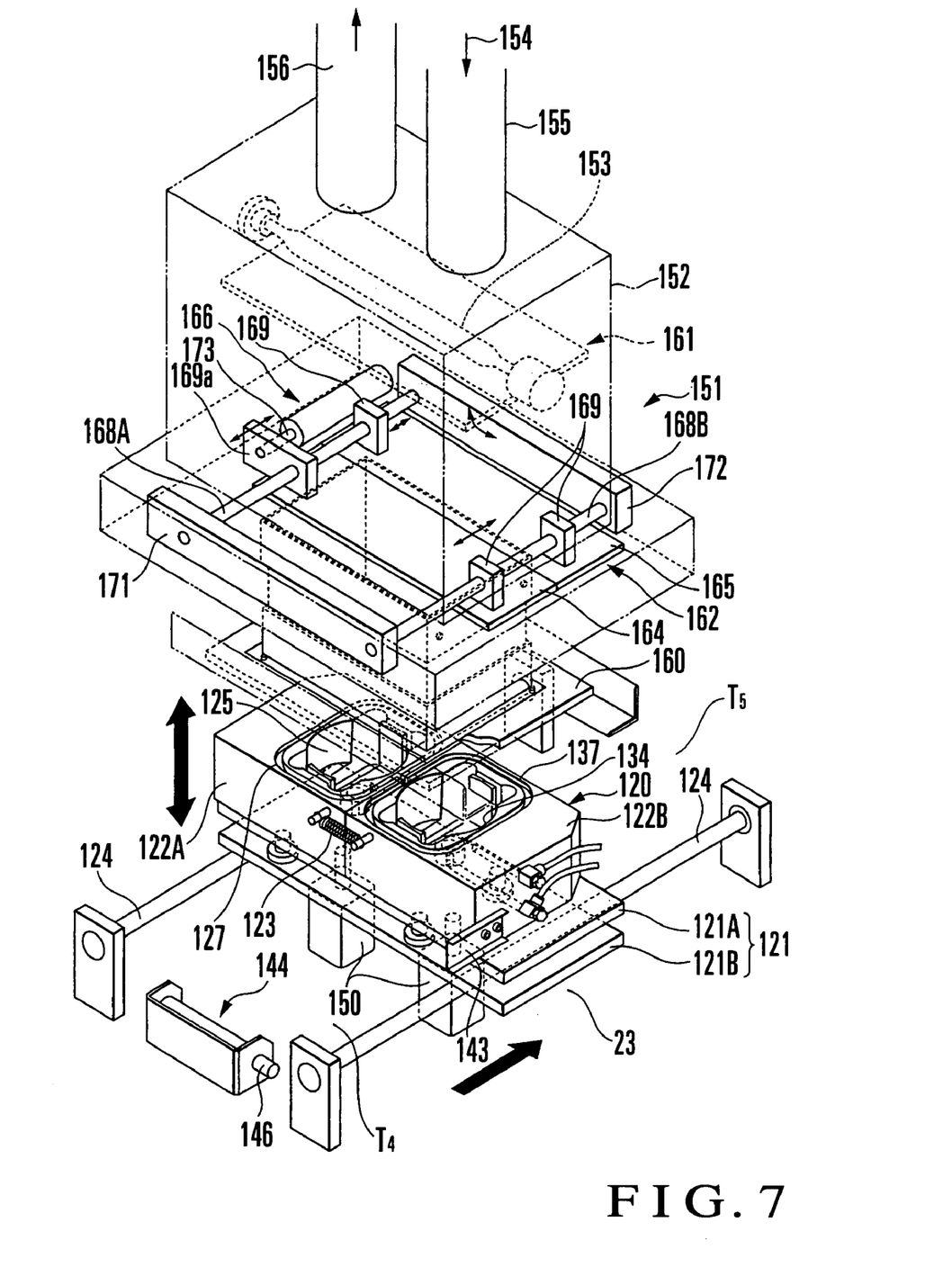
FIG. 7 is a perspective view showing the outer appearance of a state wherein a lens rack is moved to a curing portion.
Figure 8:
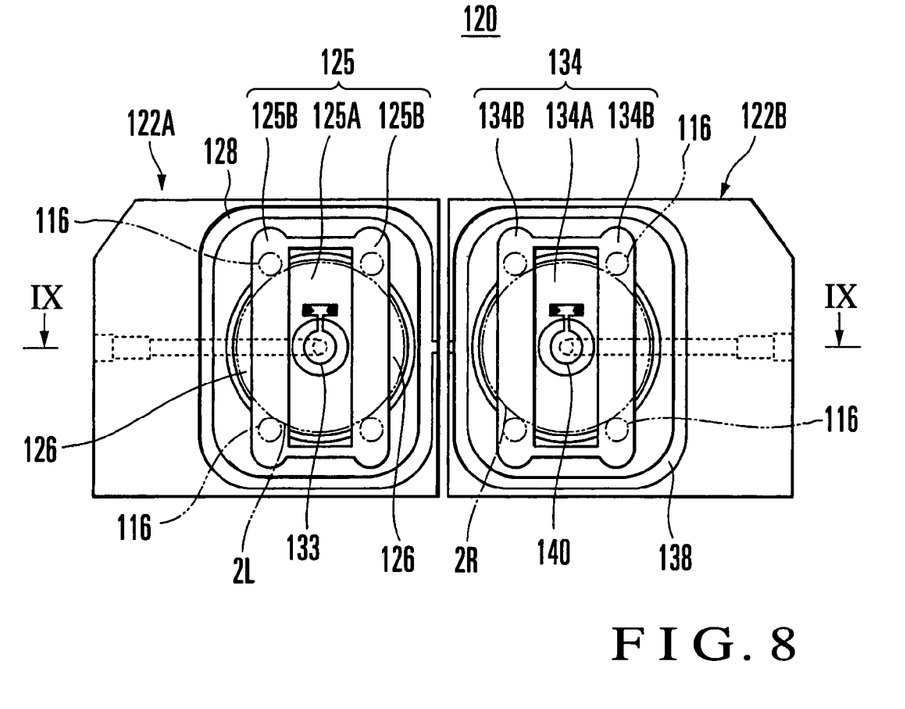
FIG. 8 is a plan view of the lens rack.
Figure 9:
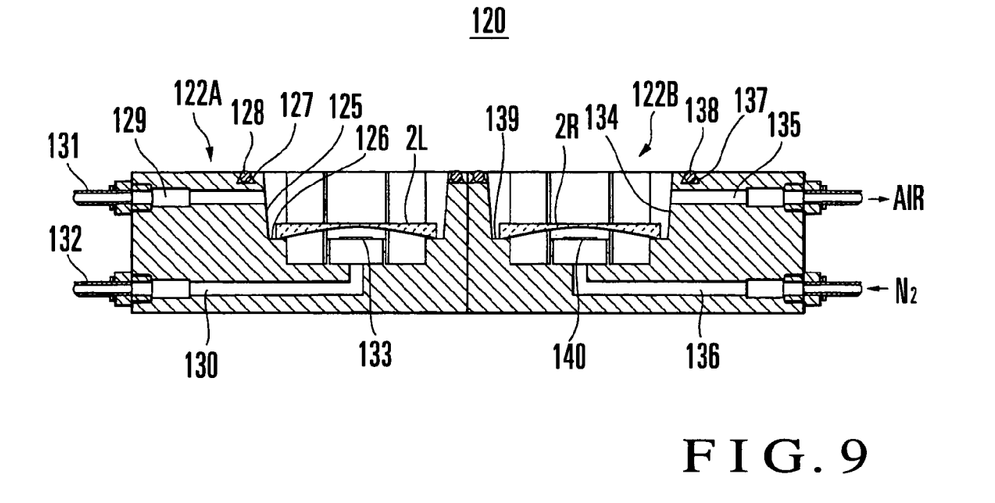
FIG. 9 is a sectional view taken along the line IX-IX of FIG. 8.

Referring to FIGS. 7 to 9, the lens rack 120 has two cases which are disposed on a base plate 121 and respectively store the spectacle lenses 2L and 2R, that is, a stationary case 122A which stores the left-eye spectacle lens 2L, and a movable case 122B which stores the right-eye spectacle lens 2R.

The base plate 121 comprises an upper plate 121A and lower plate 121B. The upper plate 121A is set on the lower plate 121B to be vertically movable. A pair of left and right guide bars 124 which extend parallel to each other in the back-and-forth direction slidably support the lower plate 121B. Thus, a fourth transport means 147 shown in FIG. 2 moves the lower plate 121B to reciprocate among the fourth transfer position $T_4$, the curing portion 23, and a fifth transfer position $T_5$. As the fourth transport means 147, for example, a belt driven by a motor is employed.

The stationary case 122A fixes to the left end of the upper surface of the upper plate 121A and has a storing portion 125 which opens upward to store the spectacle lens 2L. The storing portion 125 comprises a hole 125A which stores the spectacle lens 2L, and a pair of left and right pin grooves 125B, which are long in the back-and-forth direction and each of which has one end communicating with the hole 125A. A pair of left and right lens placing portions 126 integrally project from the inner wall of the storing portion 125 to support the two, left and right ends of the peripheral portion of the spectacle lens 2L.

The hole 125A tapers such that its diameter increases upward, to facilitate insertion and extraction of the spectacle lens 2. The tapered hole 125A facilitates irradiation of the peripheral portion of the spectacle lens 2L with the ultraviolet radiation when the light irradiation device 151 (to be described later) cures the coating solution 63.

When the clamp means 114A of the third transport means 110 is to store the spectacle lens 2L in the storing portion 125, the four clamp pins 116 are inserted in the pin grooves 125B. The pin grooves 125B enable a fifth transport means 171 (to be described later) to extract the spectacle lens 2L.

Furthermore, the stationary case 122A is provided with an O-ring 128, air exhaust channel 129, and inert gas supply channel 130 to evacuate air in the storing portion 125 and purge it with an inert gas when curing the coating solution 63. As the inert gas, nitrogen gas is employed.

The O-ring 128 fits in an annular groove 127 formed in the upper surface of the stationary case 122A to surround the storing portion 125.

The air exhaust channel 129 is formed in the thick-walled portion of the stationary case 122A, and has one end that opens to the inner wall of the storing portion 125 and the other end connected to a vacuum pump (not shown) through a pipe 131. Similarly, the inert gas supply channel 130 is formed in the thick-walled portion of the stationary case 122A, and has one end that opens to the center of the bottom surface of the storing portion 125 and the other end connected to the nitrogen gas supply device 12 shown in FIG. 1 through a pipe 132. Therefore, the nitrogen gas supply device 12 supplies nitrogen gas as the inert gas to the storing portion 125. A baffle 133 which prevents floating of the spectacle lens 2L with the nitrogen gas is arranged, immediately under the spectacle lens 2L, at the center in the storing portion 125.

The movable case 122B is arranged on the right side of the stationary case 122A to be movable to approach and separate from the stationary case 122A. A tensile coil spring 123 biases the movable case 122B toward the stationary case 122A. The movable case 122B is axi-symmetric with the stationary case 122A and has completely the same internal structure as that of the stationary case 122A, although its outer shape is slightly different from that of the stationary case 122A. Hence, the movable case 122B has a storing portion 134 which opens upward and stores the spectacle lens 2R, an air exhaust channel 135 and inert gas supply channel 136, and an annular groove 137 which surrounds the storing portion 134. An O-ring 138 fits in the annular groove 137.

The storing portion 134 of the movable case 122B comprises a tapered hole 134A the diameter of which increases upward, and a pair of left and right pin grooves 134B each having one end which communicates with the hole 134A. A pair of left and right lens placing portions 139 and a baffle 140 are arranged in the tapered hole 134A. The pin grooves 134B allow insertion of the four clamp pins 116 of the clamp means 114B of the third transport means 110.

When the lens rack 120 stands by at the fourth transfer position $T_4$, a distance setting means 144 shown in FIG. 7 holds the stationary case 122A and movable case 122B to be spaced apart most such that the distance between the storing portions 125 and 134 is equal to the distance $d_1$ between the first lens stages 41.

The distance setting means 144 comprises an air cylinder which horizontally extends on the apparatus stationary side of the fourth transfer position $T_4$, and its movable rod 146 usually presses a plate 143 provided to the movable case 122B against the tensile coil spring 123, so the movable case 122B is spaced apart from the stationary case 122A. The distance setting means 144 switches from ON to OFF immediately before the lens rack 120 moves from the fourth transfer position $T_4$ toward the curing portion 23, so as to release the plate 143 that has been pressed by the rod 146. When the movable case 122B pressed by the distance setting means 144 is released, the spring force of the tensile coil spring 123 moves the movable case 122B leftward to abut against the stationary case 122A, thus narrowing the distance between the centers of the storing portions 125 and 134 of the two stationary cases 122A and 122B. The distance between the centers is equal to the distance $d_2$ between the spectacle lenses 2L and 2R in the tray 24.

A rack elevating means 150 which vertically moves the lens rack 120 together with the upper plate 121A is disposed under the curing portion 23. The light irradiation device 151 is disposed above the curing portion 23. The rack elevating means 150 comprises a pair of left and right air cylinders. When the lens rack 120 stops at the curing portion 23, the rack elevating means 150 is driven to push up the upper plate 121A to the height of the lower surface of the light irradiation device 151.

Figure 10:
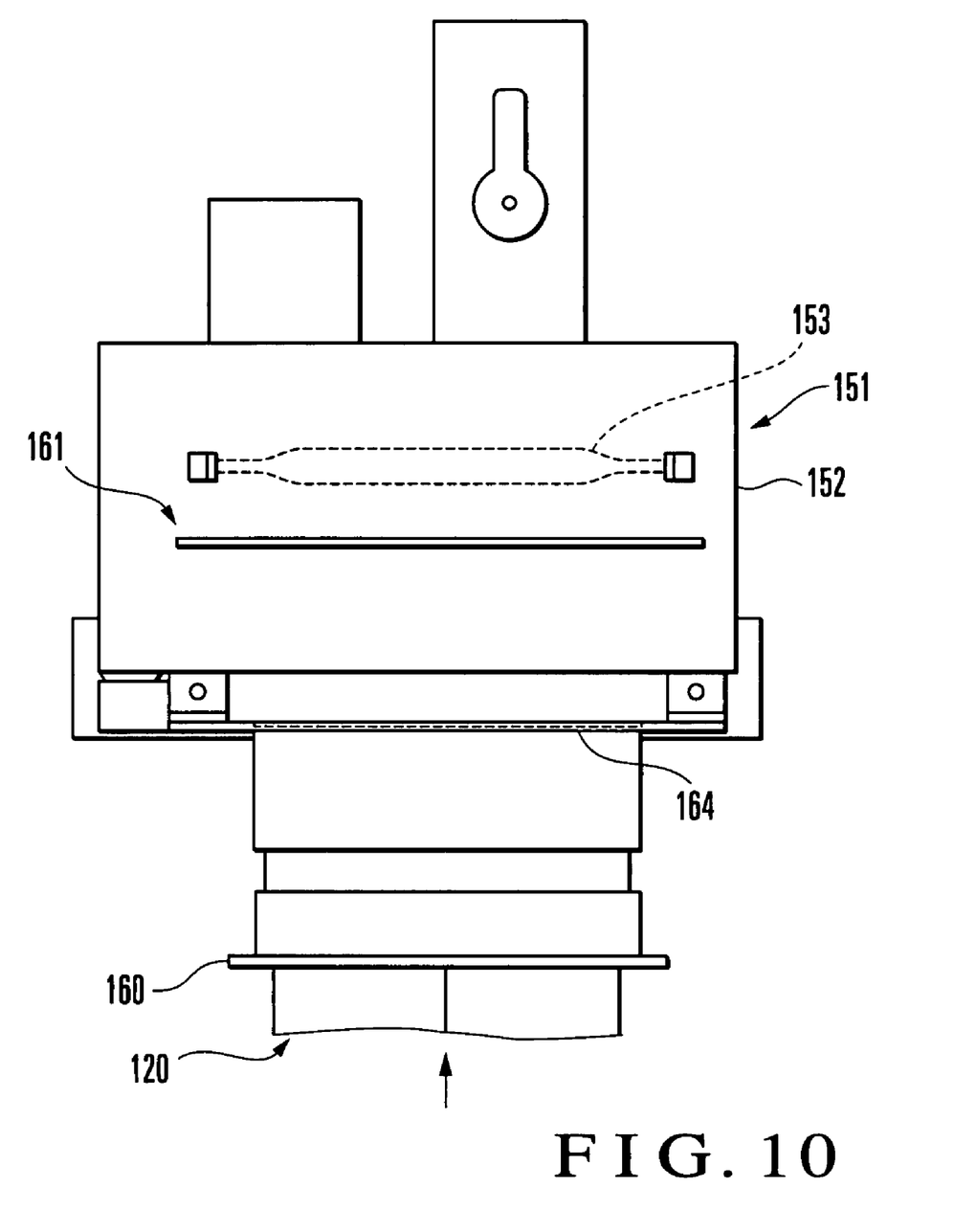
FIG. 10 is a front view of a light irradiation device and filter switching mechanism.
Figure 11:
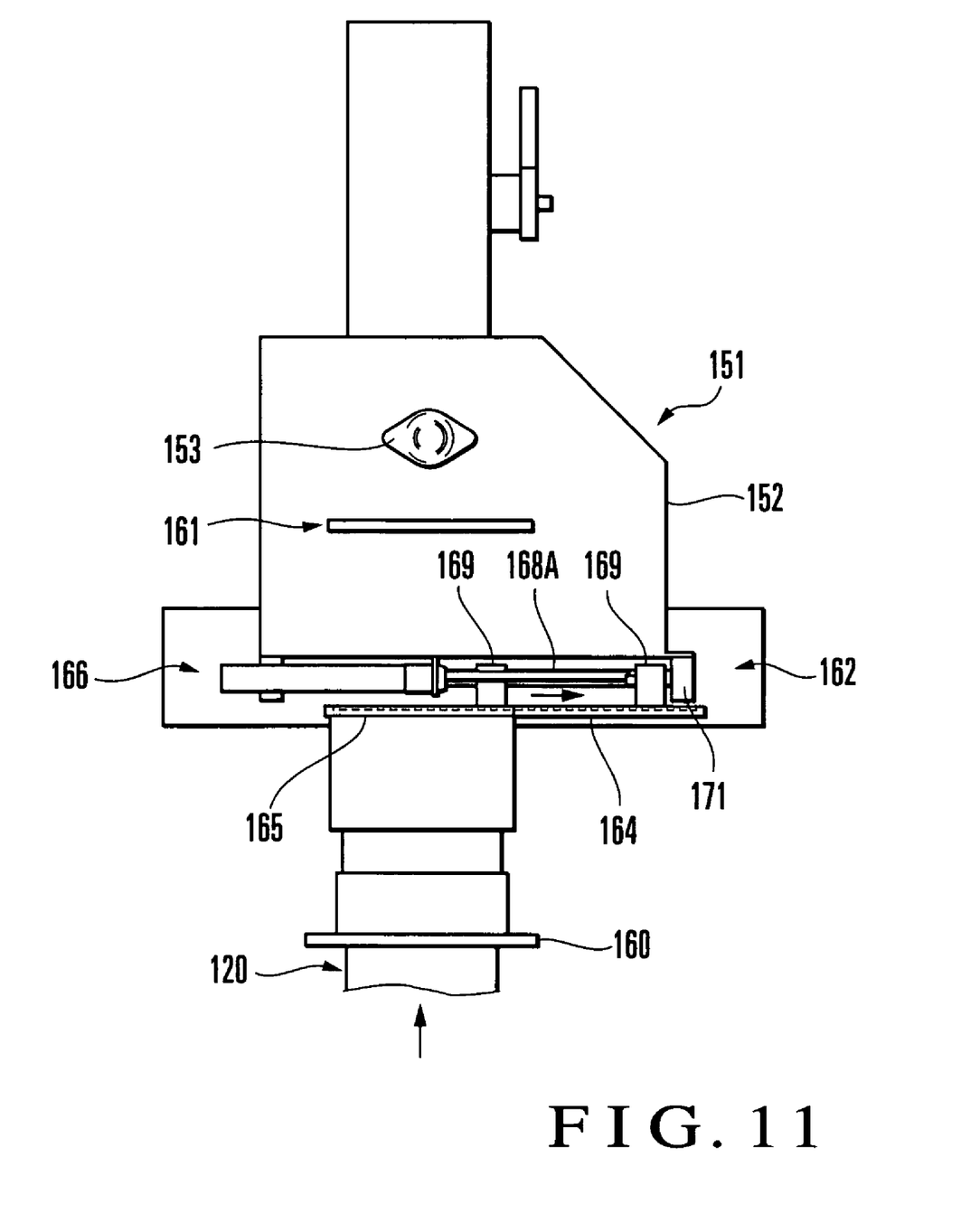
FIG. 11 is a side view of the light irradiation device and filter switching mechanism.

The light irradiation device 151 comprises a hermetic housing 152, a UV lamp 153 serving as a light source horizontally disposed in the housing 152, and an irradiation intensity switching means (not illustrated) for switching the irradiation intensity of the UV to be emitted from the UV lamp 153. Cooling air 154 is supplied into the housing 152 to prevent a temperature increase of the UV lamp 153 when the coating solution 63 is to cure. For this purpose, one end of a cooling air pipe 155 and one end of an exhaust pipe 156 connect to the upper surface of the housing 152. The other end side of the exhaust pipe 156 connects to a sirocco fan 157 shown in FIG. 1. The UV lamp 153 employs a mercury lamp, a metal halide lamp, or the like, and emits UV with a wavelength in a range of, e.g., 350 nm to 400 nm. Generally, 365 nm is a typical UV wavelength that is necessary for surface curing of the coating solution 63.

A transparent plate 160 seals the opening in the bottom surface of the housing 152. In curing the coating solution 63, when the air cylinder 150 pushes up the lens rack 120 to an ultraviolet receiving position, the stationary case 122A and movable case 122B are urged against the lower surface of the transparent plate 160 through the O-rings 128 and 138 to close the storing portions 125 and 134 of the stationary cases 122A and the movable cases 122B, respectively. When the transparent plate 160 closes the storing portions 125 and 134 of the cases 122A and 122B, air in the stationary cases 122A and 122B is purged with nitrogen gas. Then, the UV emitted from the UV lamp 153 irradiate the respective optical lenses 2L and 2R to cure the coating solution 63. Air in the stationary cases 122A and 122B is purged with the nitrogen gas to prevent the coating solution 63 from curing by reacting with oxygen in air.

Furthermore, a shutter mechanism 161 and filter switching mechanism 162 are disposed in the housing 152.

The shutter mechanism 161 is disposed between the UV lamp 153 and filter switching mechanism 162. The shutter 161 is usually held in a closed state to block the UV emitted from the UV lamp 153, and opens when curing the coating solution 63.

Referring to FIGS. 7, 10, and 11, the filter switching mechanism 162 is disposed between the shutter mechanism 161 and transparent plate 160, and comprises first and second optical filters 164 and 165 which transmit and block wavelengths within different specific ranges of UV emitted from the UV lamp 153, and a filter switching means 166 which selectively interposes the first and second optical filters 164 and 165 between the UV lamp 153 and optical lens 2.

As the first optical filter 164, a UV filter which blocks UV with a wavelength of about 370 nm to 390 nm is used. As the second optical filter 165, preferably, a UV filter which blocks UV with a wavelength of about 350 nm or less is used. As shown in FIG. 7, the first optical filter 164 and second optical filter 165 have the same size and are disposed on one plane, and their opposing long sides bond to each other to form one flat plate. A pair of left and right guide shafts 168A and 168B movably hold the first and second optical filters 164 and 165 through a plurality of slide blocks 169. A pair of shaft support members 171 and 172 support the two ends of each of the guide shafts 168A and 168B. The slide blocks 169 comprise two slide blocks for the optical filter 164 and two slide blocks for the optical filter 165, leading to a total of four slide blocks, which fix to the two ends of the upper surface of the filter 164 and the two ends of the upper surface of the filter 165, respectively.

The filter switching means 166 comprises an air cylinder disposed parallel to the side portion of one guide bar 168A. The distal end of a movable rod 173 of the air cylinder connects to one slide block 169a. The moving stroke of the movable rod 173 is almost equal to the length of the short side of each of the first and second optical filters 164 and 165. When not driving the air cylinder 166, the first optical filter 164 is located immediately under the UV lamp 153, and the second optical filter 165 stands by behind the first optical filter 164. Since the start of curing of the coating solution 63 by the light irradiation device 151 until a lapse of a predetermined period of time, the first optical filter 164 is located immediately under the UV lamp 153. When the predetermined period of time has elapsed, the air cylinder 166 is driven to move the first optical filter 164 forward. When the first optical filter 164 moves forward, as shown in FIG. 11, the second optical filter 165 moves forward to be interposed between the optical lens 2 and UV lamp 153.

In this manner, when the light irradiation device 151 cures the coating solution 63 blended with the inner curing and surface curing photopolymerization initiators, at the start of the treatment, if the first optical filter 164 having a long blocking wavelength is interposed between the UV lamp 153 and optical lenses 2L and 2R to increase the sensitivity on the long wavelength side, it can promote curing of the interior of the film before the surface of the coating solution 63 cures. When the predetermined period of time has elapsed since the start of the treatment and the interior of the film cures, the first optical filter 164 is moved at a retreating position from under the UV lamp 153, and the second optical filter 165 having a short blocking wavelength is interposed between the UV lamp 153 and optical lenses 2L and 2R to replace the first optical filter 164. As the blocking wavelength of the second optical filter 165 is shorter than that of the first optical filter 164, the long-wavelength UV enhance curing of the interior of the film while the short-wavelength UV cure the surface of the film. As a result, the coating solution 63 can cure homogeneously from the interior to the surface side. At the start of the treatment, as the interior of the film is being cured, the surface side of the film will not excessively cure to leave the interior of the film uncured. This can shorten the curing treatment time.

When switching between the first and second optical filters 164 and 165, the irradiation intensity switching means described above switches the irradiation intensity of the UV in accordance with the transmittances of the optical filters 164 and 165. More specifically, the ultraviolet irradiation intensity is decreased when the transmittance of the filter is high, and is increased when the transmittance of the filter is low, thus quickly curing the coating solution 63. Switching of the irradiation intensity can be performed easily by switching the voltage to be applied to the UV lamp 153.

Referring to FIGS. 1 and 2 again, when the treatment of curing the coating solution 63 in the light irradiation device 151 is ended, the fourth transport means 147 transports the lens rack 120 from the curing portion 23 to the fifth transfer position $T_5$. A sixth transfer position $T_6$ is arranged behind the fifth transfer position $T_5$. A pair of left and right second stages 180 are arranged at the sixth transfer position $T_6$. The second stages 180 have completely the same structures as those of the first stages 41. A fifth transport means 181 is arranged in a space above and between the fifth and sixth transfer positions $T_5$ and $T_6$. The fifth transport means 181 extracts the spectacle lenses 2L and 2R from the lens rack 120 transported to and stopped at the fifth transfer position $T_5$, transports them to the sixth transfer position $T_6$, and places them on the respective second stages 180. The fifth transport means 181 has a structure similar to that of the third transport means 110, but is different from the third transport means 110 in that the fifth stage 181 is driven by a cylinder. The fifth transport means 181 is also different in that distance between a pair of clamp means 182A and 178B which clamp the spectacle lenses 2L and 2R is set equal to the distance $d_2$ between the spectacle lenses 2L and 2R in the tray 24.

When a sixth transport means 190 holds the spectacle lenses 2L and 2R placed on the second stages 180 and transports them to the seventh transfer position $T_7$, the empty tray 24 which stands by at the seventh transfer position $T_7$ stores the spectacle lenses 2L and 2R. In FIG. 1, the seventh transfer position $T_7$ is just on the right side of the sixth transfer position $T_6$ and above the first transport means 30. A tray stopper (not shown) which stops the empty tray 24 is arranged at the seventh transfer position $T_7$.

The sixth transport means 190 reciprocates between the sixth and seventh transfer positions $T_6$ and $T_7$ to transport the spectacle lenses 2L and 2R, and has almost the same structure as that of the second transport means 44. Therefore, a repetitive description on the sixth transport means 190 will be omitted. When the empty tray 24 that stands by at the seventh transfer position $T_7$ stores the spectacle lenses 2L and 2R, the first transport means 30 is driven to transport the tray 24 backward to outside the clean room 7.

In this manner, the coating apparatus 1 according to the present invention comprises the first optical filter 164 with the long blocking wavelength and the second optical filter 165 with the short blocking wavelength. At the start of the treatment of curing the coating solution 63, the UV emitted by the UV lamp 153 irradiate the coating solution 63 through the first optical filter 164. Thus, the long-wavelength UV can cure the interior of the film before the surface side of the film cures. When a predetermined period of time has elapsed since the start of the curing treatment, the first and second optical filters 164 and 165 are switched so the UV emitted from the UV lamp 153 irradiate the coating solution 63 through the second optical filter 165. The long-wavelength UV and short-wavelength UV can be used effectively to cure the interior and surface side of the film of the coating solution 63 simultaneously. Curing of the surface side of the film does not interfere with the UV from reaching the interior of the film, so the film can cure homogeneously from the interior to the surface of the film. Also, the curing treatment time can be shortened and the productivity can be increased, which are effective for the treatment of curing a coating solution which forms a particularly thick film and has low translucency.

The embodiment described above exemplifies a case which employs the two optical filters 164 and 165 having different blocking wavelengths. Note that the present invention is not limited to this embodiment. Depending on the coating solution, two or more types of optical filters may be used.

The present invention exemplifies a case of forming a photochromic coating film on the spectacle lens 2. Note that the present invention is not limited to this embodiment, but can also be applied to a case of forming a coating film having light-shielding properties, anti-glaring properties, anti-scratch properties, and the like.

INDUSTRIAL APPLICABILITY

The present invention is not limited to a spectacle lens but can also be applied to an optical lens such as a camera lens.

The invention claimed is:
1. An optical lens coating apparatus characterized by comprising:
   a light source which emits ultraviolet radiation to a coating solution applied to a coating target surface of an optical lens to cure the coating solution, and a filter switching mechanism disposed between said light source and the optical lens,
   wherein said filter switching mechanism comprises at least first and second optical filters which transmit and block wavelengths within different specific ranges of the ultraviolet radiation emitted from said light source, and
   filter switching means for selectively interposing said first optical filter and said second optical filter between said light source and said optical lens,
   wherein said first optical filter has a blocking wavelength longer than that of said second optical filter, and is interposed between said light source and said optical lens by said filter switching means since start of curing the coating solution by irradiation with the ultraviolet radiation until a lapse of a predetermined period of time, and
   said second optical filter is interposed between said light source and said optical lens, when the predetermined period of time has elapsed, to replace said first optical filter,
   the first optical filter and the second optical filter are disposed on a same plane;
   the first optical filter is placed directly below the light source until a lapse of a predetermined period of time after a start of curing of the coating solution;
   the first optical filter moves to a retreat position by actuation of the filter switching means from the position directly below the light source after a lapse of a predetermined period of time; and
   the second optical filter moves so as to be interposed in between the optical lens and the light source as the first optical filter moves to said retreat position.
2. An optical lens coating apparatus according to claim 1, characterized in that said first optical filter comprises a UV filter which blocks ultraviolet radiation having a wavelength of not more than about 370 nm to 390 nm, and said second optical filter comprises a UV filter which blocks ultraviolet radiation having a wavelength of not more than about 350 nm.

3. An optical lens coating apparatus according to claim 1, characterized in that said filter switching mechanism further comprises irradiation intensity switching means for switching an irradiation intensity of the ultraviolet radiation emitted by said light source in accordance with transmittances of said first optical filter and said second optical filter.

4. An optical lens coating apparatus according to claim 1, further comprising
   a lens rack which stores an optical lens coated with the coating solution and transports the optical lens from a coating position to an ultraviolet receiving position, and nitrogen purging means for purging air in said lens rack with nitrogen.

5. An optical lens coating apparatus comprising:
   a light source which emits ultraviolet radiation to a coating solution applied to a coating target surface of an optical lens to cure the coating solution, and a filter switching mechanism disposed between said light source and the optical lens,
   wherein said filter switching mechanism comprises at least first and second optical filters which transmit and block wavelengths within different specific ranges of the ultraviolet radiation emitted from said light source, and
   filter switching means for selectively interposing said first optical filter and said second optical filter between said light source and said optical lens,
   a lens rack which stores an optical lens coated with the coating solution and transports the optical lens from a coating position to an ultraviolet receiving position, and nitrogen purging means for purging air in said lens rack with nitrogen,
   a housing which stores said light source,
   a transparent plate arranged on a lower surface of said housing, and
   rack elevating means for moving said lens rack upward to bring said lens rack into tight contact with said transparent plate, thereby hermetically closing said lens rack.

* * * * *